(12) United States Patent
Scarfe et al.

(10) Patent No.: US 11,034,034 B2
(45) Date of Patent: Jun. 15, 2021

(54) PACKING ROBOT

(71) Applicant: Robotics Plus Limited, Tauranga (NZ)

(72) Inventors: Alistair John Scarfe, Tauranga (NZ);
Florian Thomas Roeske, Tauranga (NZ); Kyle Selwyn Peterson, Mount Maunganui (NZ)

(73) Assignee: Robotics Plus Limited, Tauranga (NZ)

( * ) Notice: Subject to any disclaimer, the term of this patent is extended or adjusted under 35 U.S.C. 154(b) by 180 days.

(21) Appl. No.: 16/095,123

(22) PCT Filed: Apr. 20, 2017

(86) PCT No.: PCT/IB2017/052263
§ 371 (c)(1),
(2) Date: Oct. 19, 2018

(87) PCT Pub. No.: WO2017/182974
PCT Pub. Date: Oct. 26, 2017

(65) Prior Publication Data
US 2019/0143542 A1    May 16, 2019

(30) Foreign Application Priority Data

Apr. 21, 2016    (NZ) ........................ 719267

(51) Int. Cl.
*B65B 35/58*    (2006.01)
*B25J 19/02*    (2006.01)
(Continued)

(52) U.S. Cl.
CPC ............. *B25J 19/023* (2013.01); *B25J 9/026* (2013.01); *B25J 15/0052* (2013.01);
(Continued)

(58) Field of Classification Search
CPC .......... B65B 25/04; B65B 35/58; B65B 5/08; B65B 5/105; B65B 25/046; B25J 15/0061;
(Continued)

(56) References Cited

U.S. PATENT DOCUMENTS

| | | | |
|---|---|---|---|
| 5,737,901 A * | 4/1998 | De Greef | B25J 9/1697 53/446 |
| 6,691,854 B1 | 2/2004 | De Greef | |
| 2015/0130201 A1* | 5/2015 | Crosby | B65G 47/918 294/188 |

FOREIGN PATENT DOCUMENTS

| | | |
|---|---|---|
| EP | 0644120 A1 | 3/1995 |
| WO | 2008/130256 A1 | 10/2008 |

(Continued)

OTHER PUBLICATIONS

International Search Report dated Jul. 31, 2017 for International Patent Application No. PCT/IB2017/052263.

*Primary Examiner* — Timothy R Waggoner
(74) *Attorney, Agent, or Firm* — Sterne, Kessler, Goldstein & Fox P.L.L.C.

(57) ABSTRACT

A produce packing robot is provided comprising a plurality of heads for picking up items of produce from a plurality of pick-up locations, and moving the items of produce and dropping them off at a plurality of drop-off locations. The plurality of heads move together in a first direction on a common rail. The robot may also comprise a range imaging camera and controller for sensing the location of the drop-off points dynamically.

19 Claims, 7 Drawing Sheets

(51) Int. Cl.
*B25J 9/02* (2006.01)
*B25J 15/00* (2006.01)
*B25J 15/06* (2006.01)
*B65B 25/04* (2006.01)
*B65B 35/38* (2006.01)
*B65B 5/08* (2006.01)
*B65B 5/10* (2006.01)
*B65B 57/10* (2006.01)

(52) U.S. Cl.
CPC ............ *B25J 15/0616* (2013.01); *B65B 5/08* (2013.01); *B65B 5/105* (2013.01); *B65B 25/04* (2013.01); *B65B 35/38* (2013.01); *B65B 35/58* (2013.01); *B65B 57/10* (2013.01)

(58) Field of Classification Search
CPC .................. B65G 47/244; B65G 47/24; B65G 2201/0211; B65G 47/918
See application file for complete search history.

(56) References Cited

FOREIGN PATENT DOCUMENTS

| | | |
|---|---|---|
| WO | 2008/148177 A2 | 12/2008 |
| WO | 2014/068418 A1 | 5/2014 |

\* cited by examiner

PACKING ROBOT

FIELD OF TECHNOLOGY

The present invention relates generally to a robot for packing produce.

BACKGROUND

Traditional pack houses for packing produce are manually operated and involve labour-intensive processes. The work of packing produce tends to be repetitive in nature, and may place the staff packing the produce in close proximity to dangerous machinery. Where pack houses are automated, advantages may be provided such as safety by removing staff from proximity to the machinery, increases in the speed of packing and increases in the throughput of produce, as packing which is automated may operate continuously. However, the automation of packing commonly involves complex machinery that are also very costly.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

It is an object of the present invention to provide an improved packing robot, or to at least provide a useful choice.

SUMMARY OF THE INVENTION

In one aspect, the present invention broadly consists in a robot for packing produce comprising;
a plurality of pickup locations for the produce, the pickup locations arranged in an array,
a drop off zone for the produce, and
a plurality of heads, arranged in an array, each head for picking up, holding and dropping off an item of produce, and
wherein the plurality of heads move together as a set in a first direction between the array of pickup locations and the drop off zone, and
wherein each head is independently moveable in a second direction, being a direction orthogonal to the first direction, to vary the spacing of the plurality of heads in the second direction.

According to a further aspect, each of the plurality of pickup locations further comprising an orientation module for presenting an item of produce in a desired pickup orientation with respect to at least one feature of the produce, each orientation module having
at least one orientation sensing camera for detecting and determining the location of said at least one feature, and
an orientator configured to manipulate said item of produce into a desired pickup orientation.

According to a further aspect, the orientator multi-axially rotates the item of produce until the feature is detected by the orientation sensing camera, after which the location of the feature with respect to the produce is determined.

According to a further aspect, the item of produce is subsequently rotates into the desired pickup orientation.

According to a further aspect, the feature the produce is to be oriented with respect to is selected from:

a) a physical anatomical feature,
b) a portion most visually similar to a desired colour,
c) a desired pattern, or
d) a desired texture.

According to a further aspect, the orientation of the produce is determined via the at least one orientation sensing camera with respect to a plurality of features, one of said features being a primary feature with respect to which the produce is placed in the desired pickup orientation.

According to a further aspect, the produce is such that it has a stem and/or a calyx, and the primary feature with respect to which the produce is placed in the desired pickup orientation being either a stem or a calyx.

According to a further aspect, the orientator comprises:
a pair of independently controlled and laterally spaced drive belts, configured to support an item of produce,
a boundary at least partially surrounding the item of produce to constrain translational movements of the produce,
wherein the plurality of drive belts are able to drive at different rates in order to multi-axially rotate the item of produce.

According to a further aspect, the drop off zone is provided with one or more receptacles for receiving the produce provided, the one or more receptacles defining one or more desired locations for placing items of produce, and the desired locations for placing items of produce being the drop off points for the produce.

According to a further aspect, the receptacles are trays or boxes, or punnets, or bags.

According to a further aspect, the trays or boxes have contoured pockets for receiving items of produce, the contoured pockets being the drop off points.

According to a further aspect, the produce packing robot further comprises a destination sensing video camera to sense the location of the drop off points, within the drop off zone.

According to a further aspect, the produce packing robot further comprises a destination sensing camera located to sense one or more of the location, size and orientation of the contoured pockets.

According to a further aspect, the destination sensing camera is a range imaging camera selected from one of:
a) a structured light camera,
b) a RGBD camera,
c) a stereo camera pair, or
d) a time-of-flight camera According to a further aspect, the receptacles pass through the drop off zone on a conveyor.

According to a further aspect, the movement of the conveyor through the drop off zone is controlled by the robot.

According to a further aspect, the number of heads is less than the number of pickup locations for the produce.

According to a further aspect, the movement of the heads in the second direction to vary the spacing of the heads is such as to allow the heads to each move between multiple pickup locations and multiple drop off points.

According to a further aspect, packing an item of produce involves:
a) locating the array of heads in the first direction so that at least one head is aligned in the first direction with an item of produce at a pickup location,
b) independently varying the spacing of one or more heads in the second direction to align in the second direction the at least one head with the item of produce,
c) picking up the item of produce, d) transporting the item of produce in the first direction to the drop off zone such that item of produce is aligned in the first direction with a desired drop off point, and e) dropping off the item of produce to the desired drop off point.

According to a further aspect, prior to dropping off the items of produce, the spacing of one or more heads is varied in the second direction.

According to a further aspect, the step of picking up an item of produce involves lifting it from the pickup location, and the step of dropping off the item of produce involves lowering it to the drop off point.

According to a further aspect, the packing of an item of produce also involves a rotation of the desired head about an axis parallel to the third direction in order to rotate the item of produce to a desired drop off orientation.

According to a further aspect, the produce to be packed is sorted by size or other feature, as sensed by the orientation sensing camera of each orientation module.

According to a further aspect, the produce is sorted by size or other feature onto a plurality of receptacles located in the drop off zone.

According to a further aspect, the produce packing robot further comprises a controller to control the movement of the heads.

According to a further aspect, the orientation module may indicate to the controller when an item of produce is in a desired pickup orientation and ready to be picked up.

According to a further aspect, the orientation module may indicate to the controller when the feature is detected by the orientation sensing camera that an item of produce is nearly ready to be picked up.

According to a further aspect, after a nearly ready signal is received the controller waits for an item of produce to be manipulated into the desired pickup orientation depending on:

a) the number of heads which have picked up and are holding an item of produce, b) the number of pickup points having an item of produce ready to be picked up, and c) the number of pickup points having an item of produce nearly ready to be picked up.

According to a further aspect, after a nearly ready signal is received the controller ignores the signal and drops off the items of produce currently held by the heads when:

a) all the heads are already holding an item of produce, or b) the number of items of produce ready for pickup are greater than or equal to the number of heads not holding an item of produce.

According to a further aspect, the controller bases the decision whether to wait for a nearly ready item of produce to become ready on an estimated comparison of the time until the item of produce is oriented into the desired pickup orientation and is ready to be picked up and the time required to drop off the items of produce currently held by the heads and return to the pickup location.

According to a further aspect, each head further comprises a suction cup portion at a distal end of the head for holding the item of produce, where the suction cup portion may be selectively provided with a vacuum to pick up and hold an item of produce.

According to a further aspect, each head further comprises a collapsible cushion portion provided between the head and the suction cup, the collapsible cushion portion being capable of contracting when a vacuum is provided to the suction cup and expanding when a positive pressure is provided to the suction cup.

According to a further aspect, the produce is apples.

In a further aspect, the present invention broadly consists in a robot for packing produce comprising;

one or more pickup locations for the produce, a drop off zone containing one or more receptacles for the produce, the receptacles having a number of desired placement locations for the produce, being drop off points for the produce, a destination sensing camera for sensing the location of the drop off points of the receptacles, and a plurality of heads, arranged in an array, each head adapted to picking up an item of produce from a pickup location, and hold it, and dropping off an item of produce at a drop off point.

According to a further aspect, the plurality of heads move together as a set in a first direction between the array of pickup locations and the drop off zone, and wherein each head of the array of heads is independently moveable in a second direction, being a direction orthogonal to the first direction, to vary the spacing of the plurality of heads in the second direction.

According to a further aspect, the drop off points in the receptacles comprise contoured pockets or depressions to receive the produce.

According to a further aspect, the robot further comprises a controller to calculate the location of the drop off points and for controlling the movement of the heads.

According to a further aspect, packing an item of produce involves the controller:

a) locating the array of heads in the first direction so that a desired head is aligned with the pickup location in the first direction, b) independently varying the spacing of one or more heads in the second direction to align the desired head with the pickup location in the second direction, c) picking up the item of produce from the pickup location, d) determining from the destination sensing camera the locations of drop off points that are unoccupied by an item of produce, e) selecting a desired drop off point, f) transporting the item of produce in the first direction and second direction by a movement of the array of heads and a variation of the spacing of one or more heads, respectively, such that item of produce is aligned in the first and second directions with a desired drop off point, and g) dropping off the item of produce to the desired drop off point.

According to a further aspect, the desired drop off point is selected by the controller in order to first fill the drop off points furthest from the pickup location or locations.

According to a further aspect, the desired drop off point is selected by the controller in order to minimize the time an item of produce is waiting at the pickup location.

According to a further aspect, the desired drop off point is selected by the controller in order to minimize the movement of the heads in the first direction.

According to a further aspect, wherein the desired drop off point is selected by the controller in order to minimize the movement of the heads in the second direction.

According to a further aspect, the heads may independently move in a third direction, being a direction orthogonal to the plane of movement of the heads in the first and second directions.

According to a further aspect, the heads may independently rotate about their axis parallel to a third direction, being a direction orthogonal to the plane of movement of the heads in the first and second directions.

According to a further aspect, the destination sensing camera also senses either or both of the size and orientation of the drop off points.

According to a further aspect, the controller rotates the heads about their axis parallel to the third direction in order to orient the produce to the orientation of the drop off point.

According to a further aspect, the destination sensing camera is located or is locatable substantially over the drop off zone.

According to a further aspect, the destination sensing camera is a range imaging camera selected from one of:
a) a structured light camera,
b) a RGBD camera,
c) a stereo camera pair, or
d) a time-of-flight camera.

According to a further aspect, each pickup location further comprises a orientation module for orienting each item of produce to a desired pickup orientation, where each orientation module signals the array of heads when an item of produce may be picked up when the item of produce is in, or nearly in, the desired pickup orientation.

According to a further aspect, the receptacles are located on a conveyor, the conveyor either moving in a stepped fashion as the destination sensing camera indicates a portion of the receptacle is filled or moving in a continuous fashion.

According to a further aspect, wherein the produce is apples.

In another aspect, the invention consists broadly in a method of packing produce utilising the robot as claimed in any one or more of the previous claims.

In another aspect, the invention consists broadly in a produce packing robot substantially as herein described with reference to any one or more of the figures.

In another aspect, the invention consists broadly in a method of operating a produce packing robot substantially as herein described with reference to any one or more of the figures.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

The invention consists in the foregoing and also envisages constructions of which the following gives examples only.

DETAILED DESCRIPTION

Figure 1:
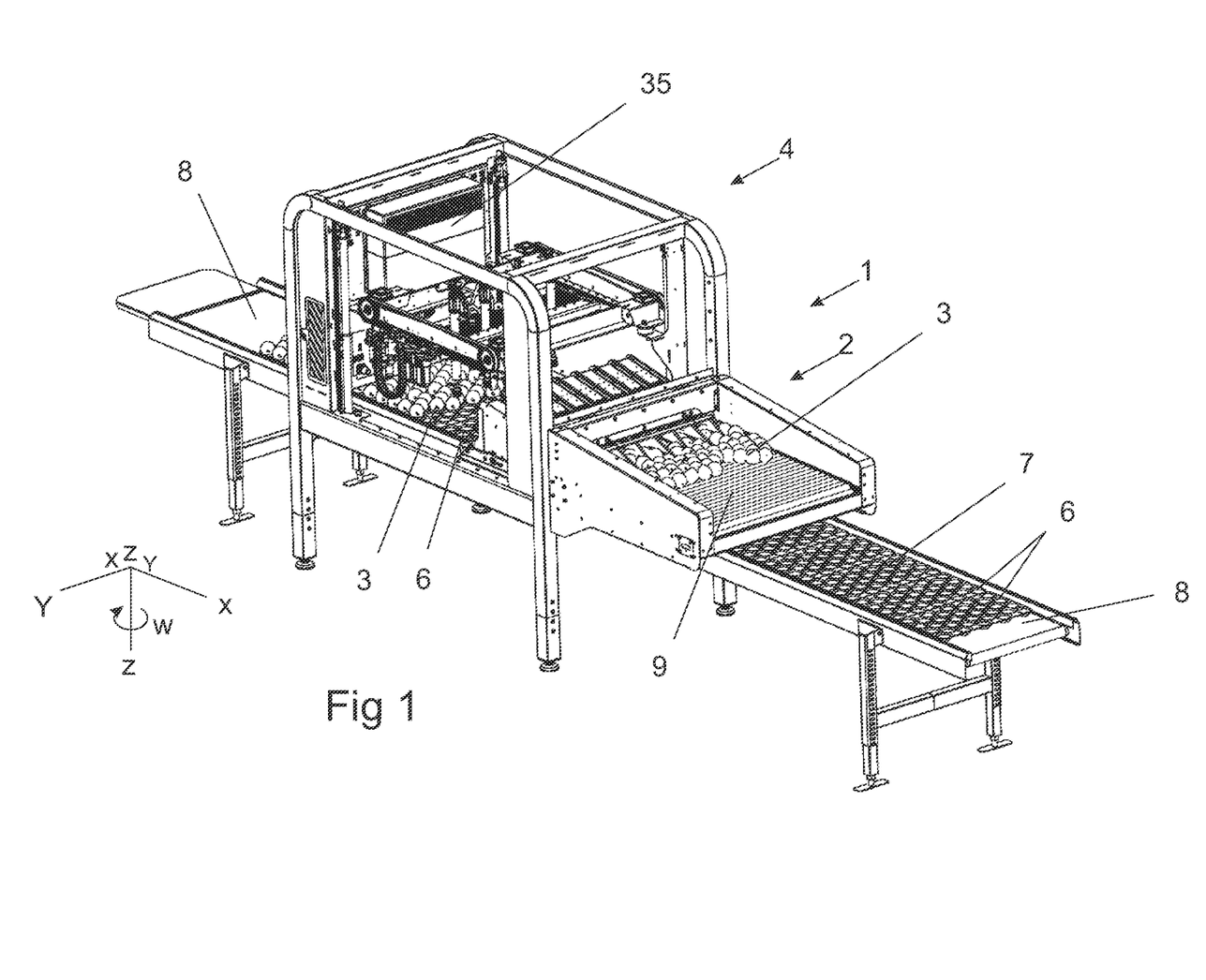
FIG. 1 is a perspective view of the produce packing robot showing the produce accumulator, receptacle conveyor and produce packing area with produce packed onto some receptacles.
Figure 2:
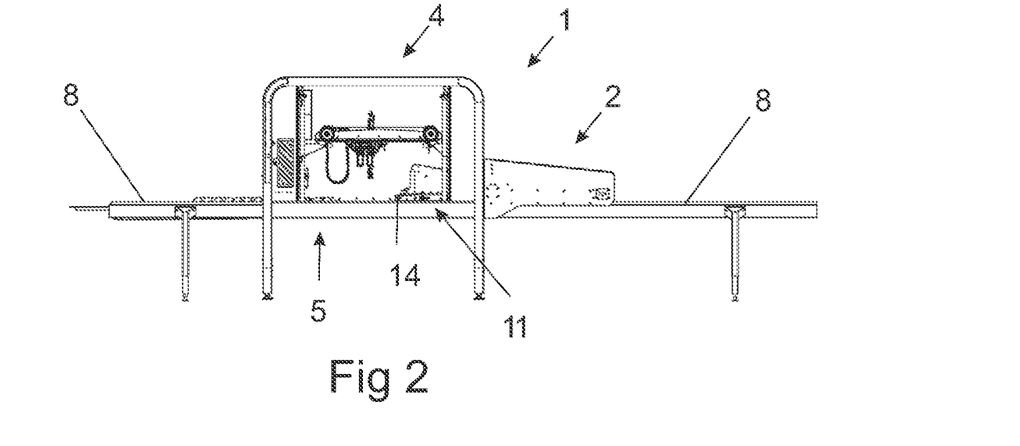
FIG. 2 is side view of the produce packing robot of FIG. 1.
Figure 3:
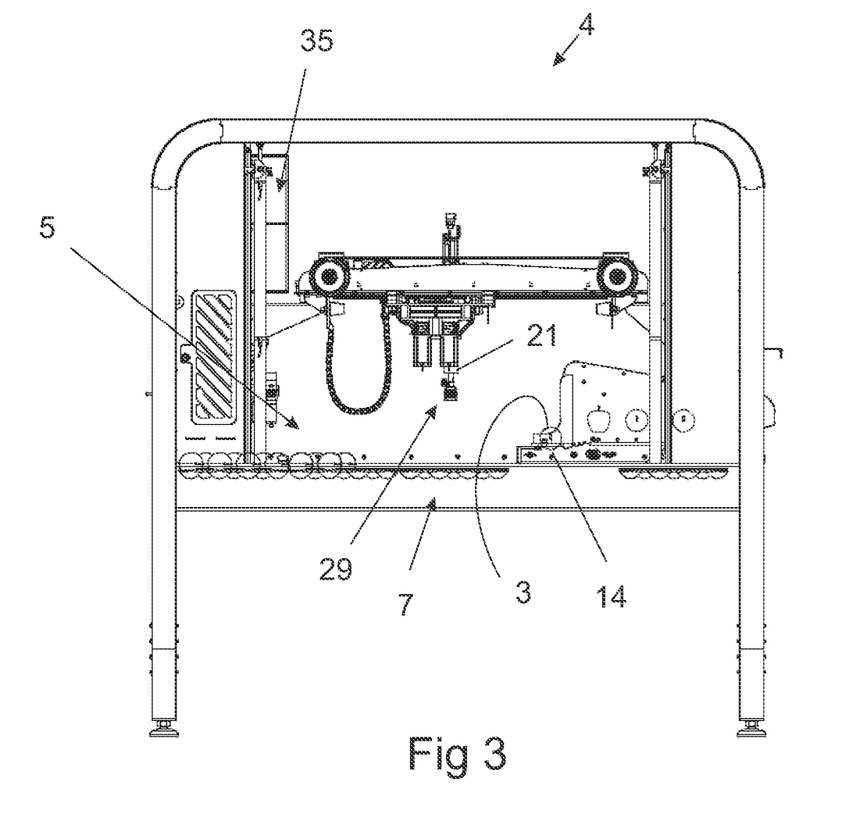
FIG. 3 is a partial view of the produce packing robot of FIG. 2, showing only the produce packing area with the pickup locations, multi-head robot, and drop off zone with receptacles in it.

With reference to FIGS. 1 to 2 a produce packing robot 1 is shown. The produce packing robot 1 has an accumulator 2 for produce items 3 and a produce packing area 4. Produce enters the packing area 4 through the accumulator 2, then is packed in the packing area 4. Inside the packing area the produce is passed from a number of pickup locations 14, to a drop off zone 5 where it is packed onto receptacles 7. The receptacles preferably have a number of desired locations for placing the produce 3, which are the drop off points 6 for the produce items 3.

The receptacles may be located in the packing area by way of a receptacle conveyor 8 which passes beneath the accumulator 2 and produce packing area 4. Produce which is packed onto the receptacles 7 then leaves the packing area on the conveyor 8.

Produce enters into the produce packing robot 1 by way of the accumulator 2. Produce may be fed to the accumulator 2 either manually or by an external feed source, such as a conveyor (not shown) or any other suitable means. The accumulator has an accumulator conveyor 9 which moves the produce 3 towards a number of singulators 10 which are spaced apart to create channels between them. The width of the channels is such as to allow only single item of produce to pass through at a time, forming the produce into singulated rows as seen in FIG. 4.

The accumulator conveyor 9, may also preferably include a device for spreading the produce substantially evenly into the singulators 10.

Figure 4:
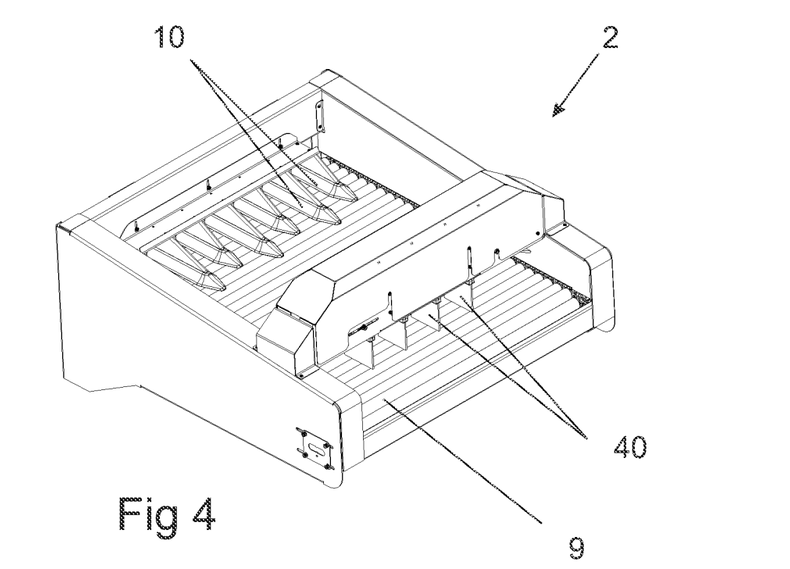
FIG. 4 is a view of the accumulator for the produce, which feeds produce to each of the orientation modules, showing the singulators for channelling the produce into single rows.

For example, with reference to FIG. 4, a plurality of brushes or wipers 40 may be provided to guide or distribute the produce as it passes along the accumulator conveyor 9.

The brushes 40, may for example be attached to an endless belt, so that they urge the produce across the conveyor 9, as the belt rotates. In order to achieve a substantially even distribution of produce into each singulator lane, the endless belt can rotate in both directions. For example, the brushes may move in one direction for a predetermined time period, and then in the opposite direction.

It has been found that this method can achieve an acceptable improvement in evening out the produce flowing into each lane of the singulators 10.

Figure 5:
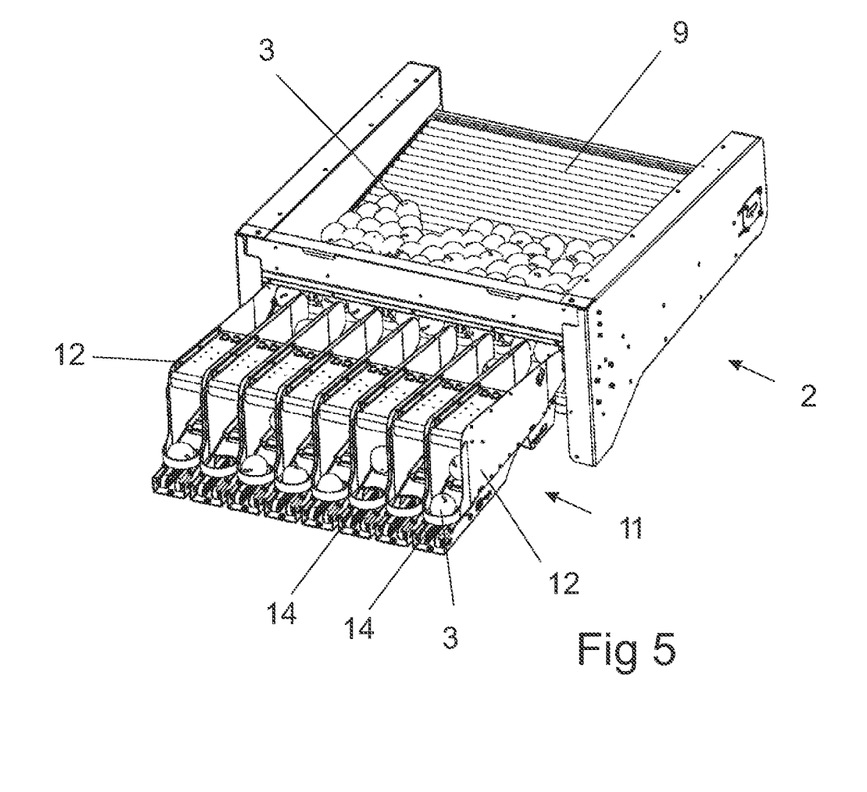
FIG. 5 is a view of the accumulator and produce orientation unit, showing the individual orientation modules, some with produce in them located on the produce feeds or at the pickup locations.
Figure 6:
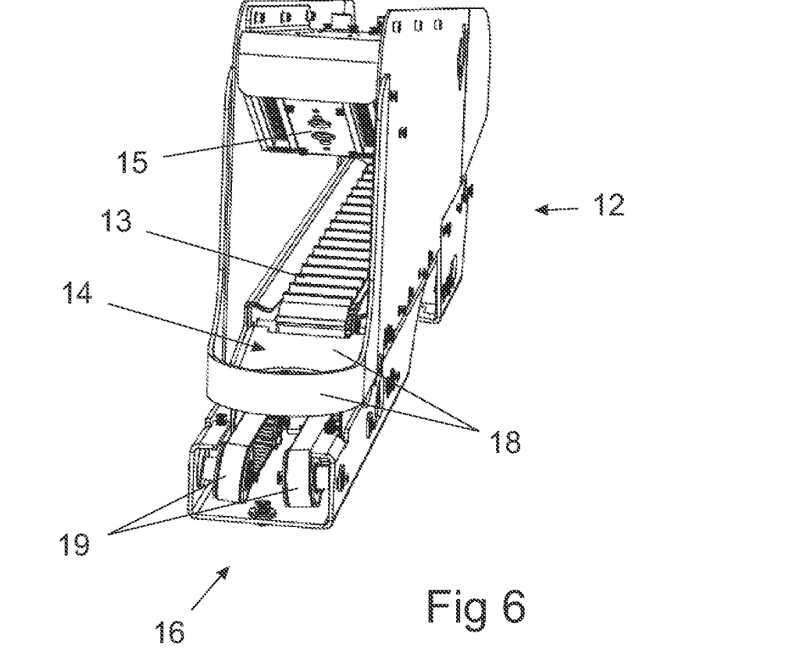
FIG. 6 is a view into an orientation module, showing the produce feed, pickup location, orientator and the orientation sensing camera which is directed towards the pickup location.
Figure 7:
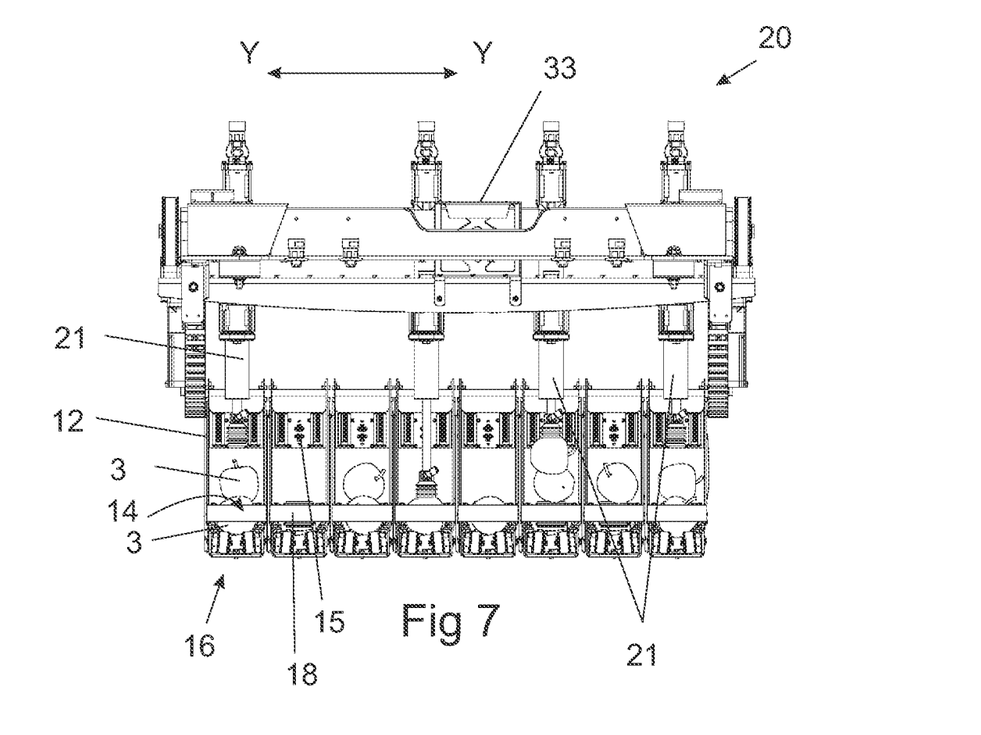
FIG. 7 is an end view of the multi-head robot and orientation modules, showing the individual heads spaced between different pickup locations, with heads having picked up an item of produce, in the process of picking up an item of produce and without an item of produce.

From the accumulator 2 the produce is passed to the produce orientation unit 11, as shown in FIGS. 5 and 6. The produce orientation unit 11 has a number of orientation modules 12 corresponding to the number of rows of produce formed by the singulators 10. Each orientation module 12 has a produce feed 13 to provide items of produce one at a time from the accumulator, to a plurality of pickup locations 14 where the produce is to be reoriented.

Each orientation module 12 includes at least one orientation sensing video camera 15 directed towards its pickup location 14. In order to change the orientation of the produce item an orientator 16 is provided at each pickup location 14. The orientator comprises a mechanism to multi-axially rotate an item of produce.

A boundary 18 is provided around at least a portion of the pickup location 14 to constrain the translational movement of the item of produce during its rotation. In the preferred form the multi-axial rotation of the rotation means 16 is provided by a pair of spaced belts 19 upon which the produce rests. The belts 19 are able to be driven at different rates and in different directions, in order to multi-axially rotate the item of produce into any desired orientation.

The produce packing area 4 is provided with a multi-head robot 20 to transfer the produce between the orientation modules 12 and the trays or receptacles 7.

As shown in FIGS. 7-11, the multi-head robot 20 has an array of individual heads 21, each for picking up, transporting and dropping off an item of produce.

As shown particularly in FIGS. 7-11, the array of heads 21 are preferably arranged in a straight line. Alternatively, the heads 21 may be arranged in a staggered array, or in an irregular array.

The individual heads 21 of the multi-head robot 20 are fixed together and travel as one unit between the produce orientation unit 11 and receptacles 7, along the XX axis as seen in FIG. 1. Each head 21 is able to be moved independently in the remaining YY and ZZ directions, and may preferably be able to be rotated in the direction W about the axis ZZ.

Figure 9:
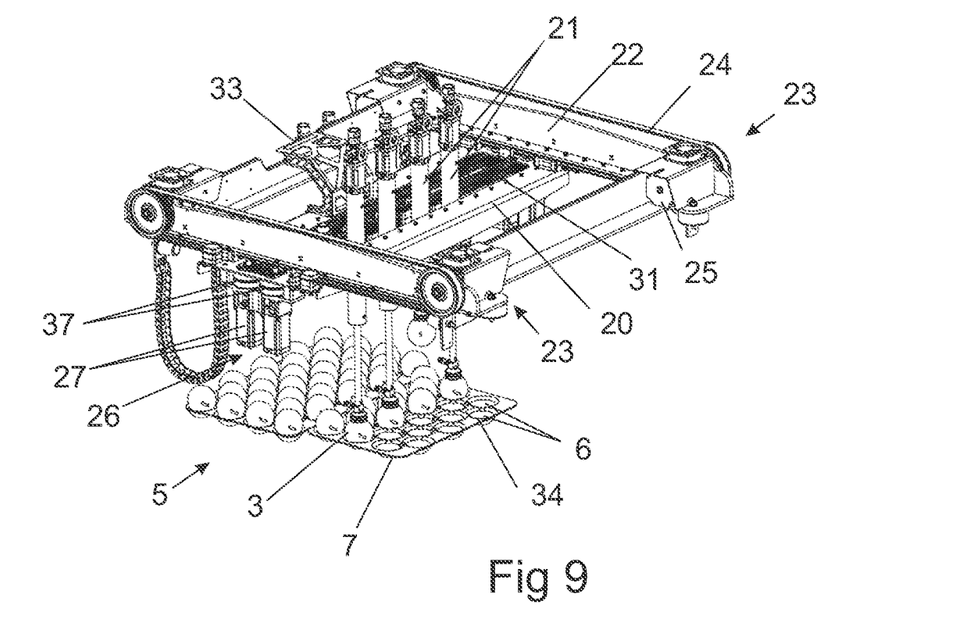
FIG. 9 is a perspective view of the produce packing area showing the multi-head robot and its frame, the drive assemblies for the multi-head robot and the individual heads, the destination sensing camera located over the drop off zone, and a number of receptacles which are being packed with produce.
Figure 10:
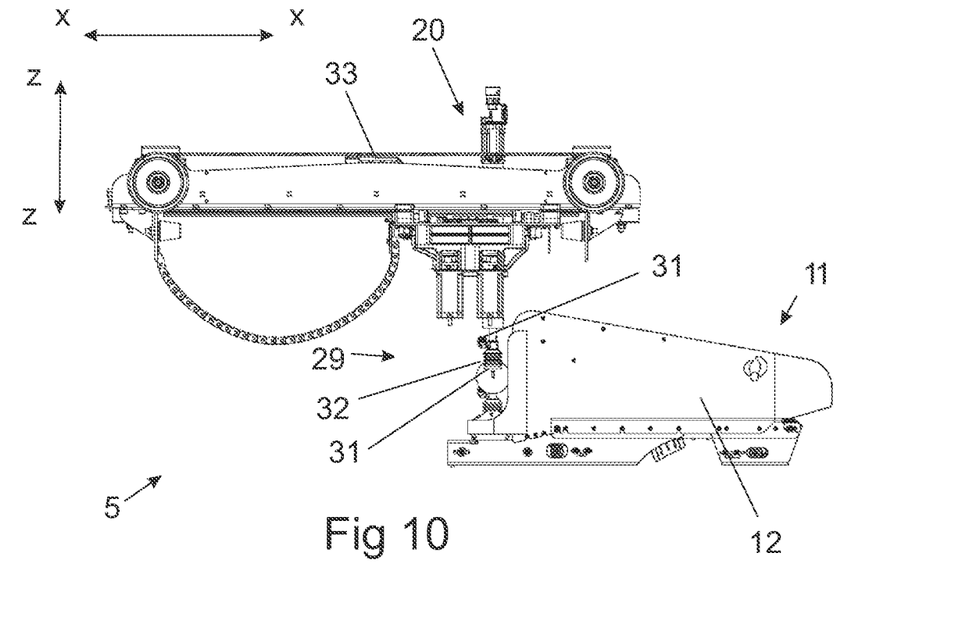
FIG. 10 is a side view of the multi-head robot and produce orientation unit, showing the multi-head robot located over the pickup locations, one head having picked up an item of produce and another head in the process of picking up an item of produce.
Figure 11:
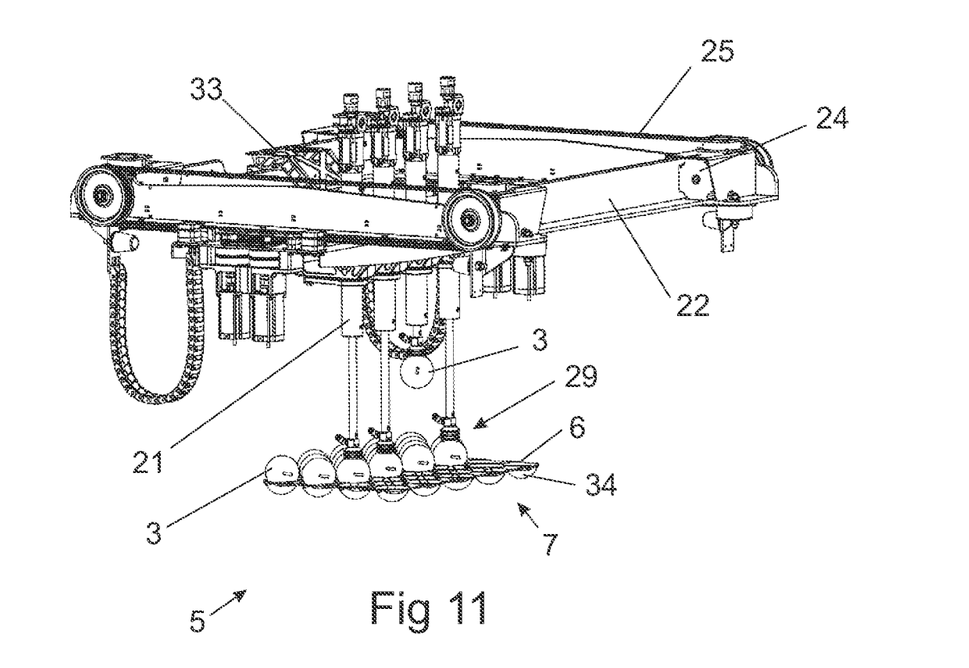
FIG. 11 shows the assembly of FIG. 9 at a different angle.

As seen in FIG. 9 the multi-head robot 20 is driven along a frame 22 in the XX direction by the multi-head drive assembly 23, which has a number of motors 24 and belt drives 25. The multi-head robot 20 then has a number of head drive assemblies 26, corresponding to the number of heads 21 of the multi-head robot, for driving each of the heads individually in the lateral YY direction.

The head drive assemblies 26 comprise a motor 27 and belt 37 which extends across the frame 22. Each motor 27 and belt drive 37 engages with one of the heads 21.

Each head 21 is also provided with a rotational drive 28 to change the orientation of the head about the ZZ axis, providing rotation in the direction W as shown in FIG. 1.

On the end of each head 21 is a produce holder 29 for picking up, holding and dropping off the items of produce 3. The produce holder may have means to grasp an item of produce, or as in the preferred configuration the produce holder is in the form of a suction cup 30.

Vacuum is applied to the suction cup 30 via pneumatic line 31. The distal end of suction cup 30 is a surface formed to allow a seal to be formed with the surface of an item of produce. When a suction cup 30 is located against an item of produce 3, and a vacuum is provided to the suction cup 30, the item of produce may be held by suction cup in order to be transported for packing. Upon arrival at a desired drop off point for the produce the vacuum may be stopped, or a positive pressure may be provided to the suction cup in order to release the item of produce 3. Each suction cup 30 may be provided with a collapsible cushion portion 32 to allow the suction cup to expand or contract along the ZZ axis of the head 21 when different pressures are provided to the suction cup 29. It is envisaged that the physical characteristics of the suction cups 30 may be tailored to suit various types of produce being packed.

Figure 12:
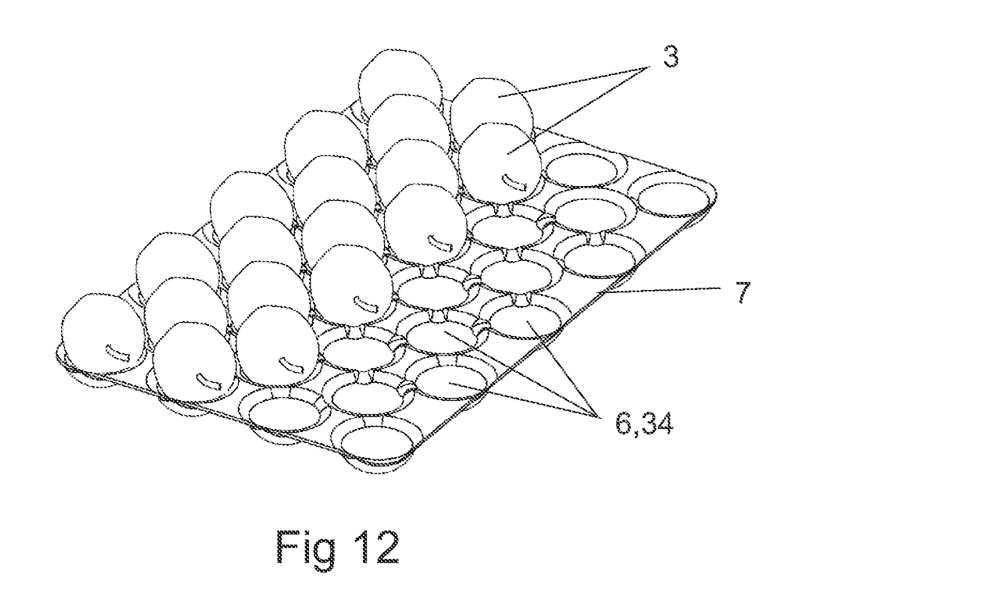
FIG. 12 shows a receptacle or tray partially filled with produce, the contoured pockets of the tray visible at the un-filled drop off points, and where the items of produce in the tray are all aligned with their stems facing parallel directions.

The receptacles 7 into which items of produce 3 are to be packed in the produce packing area 4 are supplied by the receptacle conveyor 8 which runs underneath the accumulator 2 and multi-head robot 20. The receptacles 7 may be in the form of trays as shown in FIG. 12, having an array of depressions or pockets 34 for receiving items of produce.

Alternatively, the trays may have substantially flat internal surfaces, without depressions for receiving produce. Further alternatively the receptacles 7 may be in the form of boxes with upwardly extending sides and a substantially flat base, or punnets, or bags.

A destination sensing video camera 33 is provided to the produce packing robot. As shown in FIG. 9 the destination sensing camera 33 may be located on the multi-head robot 20, to move with the assembly of heads 21. Alternatively the destination sensing camera may be fixed on the frame 22 or other component such that it remains stationary while the multi-head robot moves.

Preferably the destination sensing camera 33 is located such that it is substantially over the drop off zone 5 and the receptacles 7 to be packed with produce.

The destination sensing camera 33 may be any type of camera capable of sensing the contours of the tray or receptacle 7 such as a range imaging camera. Suitable range imaging cameras include cameras commonly referred to as structured light cameras, RGBD (red, green, blue and depth) cameras, stereo camera pairs and time-of-flight cameras. Such a range imaging camera captures distance information of an observed scene. Similar to a digital colour camera which records a representation of a scene in a grid of discrete colours, known as pixels, range cameras record distances from the surfaces in the scene is for each pixel position.

A colour camera may be combined with the range imaging camera to capture both colour and distance information.

In order to control the functions of the produce packing robot including the XX direction movement of the multi-head robot 20, the YY and ZZ direction movements and W direction rotation of each of the heads 21, the movement of the receptacle conveyor 8, accumulator conveyor 9 and produce feeds 13, a controller 35 is provided. The controller 35 also receives signals from the orientation sensing camera 15 of each orientation module 12 and the destination sensing camera 33. The controller 35 processes these signals, moves and tracks the locations of the heads 21 and controls when and how items of produce are picked up from the pickup locations and dropped off at the drop off points 6.

By having the heads 21 of the produce packing robot move together as the multi-head robot 20 in the XX direction, and then independently in the remaining directions, a system is provided with a plurality of heads, each for packing an item of produce, but which naturally lends itself to preventing crossovers or collisions between the heads.

Produce to be sorted enters the produce packing robot 1 through the accumulator 2, where it is directed into one of a number of single lanes and fed to each of the orientation modules 12. The produce feed 13 then passes these items of produce one at a time to the pickup locations 14 of the orientation modules 12. The purpose of the orientation modules is to rotate each item of produce into a desired pickup orientation.

The rotational orientation of each item of produce is determined by the orientation sensing camera 15 with respect to one or more features 36 of the produce 3. The orientator 16 at each pickup location 14 multi-axially rotate an item of produce until the orientation sensing camera 15 indicates that the produce is in the desired pickup orientation with respect to the physical feature 36.

Figure 13A:
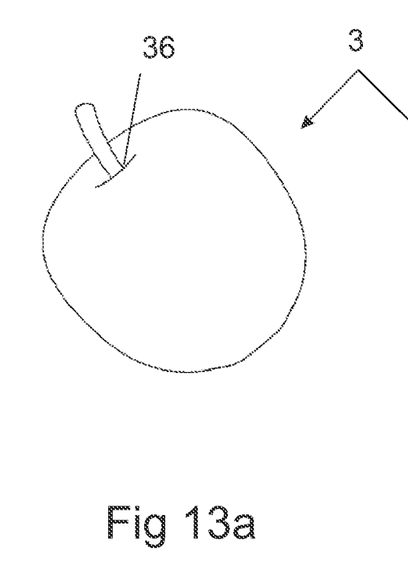
FIG. 13a shows a view of an item of produce being an apple with the apple's stem visible.
Figure 13B:
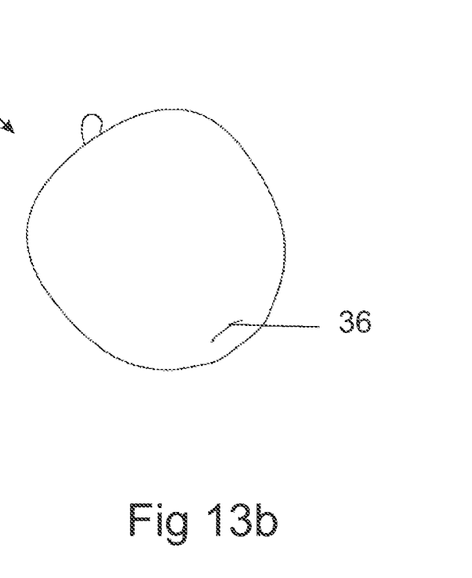
FIG. 13b shows another view of the item of produce of FIG. 13a, where the apple's calyx is visible.

As shown in FIG. 13, the desired pickup orientation is based on a feature 36 of the produce, such as an anatomical feature, e.g. the stem and/or calyx of an apple. Alternatively, or in addition, the feature may be based on a desired colour, texture, pattern, size, perimeter or some other definable feature of the produce.

As the item of produce is multi-axially rotated by the orientator 16 the orientation sensing camera 15 passes a signal to the controller 35 where appropriate vision software locates a feature and calculates the orientation of the produce.

The orientator 16 rotates the item of produce 3 until the orientation sensing camera 15 locates the feature. The controller 24 then identifies the location of the feature with respect to the geometry of the produce. Once the feature or a feature has been located the orientator 16 is operated by the controller 35 to position the produce in a desired pickup orientation. In this configuration an item of produce may rapidly be placed into the desired pickup orientation once the feature has been located.

In some configurations the controller 35 may continue to monitor the feature and provide updated instructions to the orientator 16 as the orientator positions the produce in the desired pickup orientation. As the produce may vary in size, shape and texture, resulting in inconsistent produce rotational characteristics, this feedback by continued monitoring of the feature by the controller 35 may ensure that the orientator 16 accurately rotates the produce to the desired pickup orientation.

Alternatively, quickly placing the produce into the desired pickup orientation may further be achieved if the desired pickup orientation only requires the feature to be anywhere within a plane (e.g. a plane in the XX and YY directions). In this configuration, the orientator 16 orients the item of produce to the desired pickup orientation within a XX and YY plane by rotations about these two directions. In order to orient all produce into the same final orientation on the receptacles a rotation W about the ZZ axis may be provided by each of the heads 21 when the item of produce is picked up. The required rotation of each item of produce is calculated by the controller 35.

In an example where the produce is apples and the feature is the stem 36, the apples may be placed in the pickup orientation so that the stems all lie flat along the XX-YY plane. The orientation of the feature about the ZZ direction is monitored by the controller 35, and the rotation required to achieve a consistent predetermined drop off orientation is calculated by the controller 35. When each apple is picked up by a head a rotation W is then provided to place the apple in the desired orientation on the receptacles, e.g. so they all face one parallel direction.

In this configuration where produce is only oriented by the orientator into a plane, the time required for an item of produce to be ready to be picked up may be further decreased, resulting in a potential increase in the throughput of produce through the robot.

Alternatively, the once the feature has been located by the orientation sensing camera, the controller 35 may adjust the orientator 16 to manipulate the produce until the located feature is aligned with a centroid of the produce's profile, as viewed from the orientation sensing camera. Where the produce is an apple, this alignment of the feature within the centroid may approximate an orientation along a notional stem-calyx axis. The orientator may be engaged to rotate the item of produce to place it in the desired pickup orientation, as has previously been described.

By taking the further step of aligning the feature with the centroid of the produce's profile, the controller 35 may more accurately identify the location of the feature, thus enabling a more accurate placement into the desired pickup orientation and as a result a more accurate final orientation on the receptacle.

However, while this step may increase the accuracy of the produce's final orientation, it may also result in a longer time being taken before an item of produce is ready to be picked up and a decrease in the throughput of produce through the produce packing robot.

Accordingly it may be desirable in order to reduce the time taken for an item of produce to be ready to be picked up to not use the additional step of aligning the feature with a centroid of the produce's profile. Where this additional step is not taken, the controller 35 may be configured with software to approximate the location of the feature when it is first detected by the orientation sensing camera.

In an alternate configuration there may be more than one feature, such as the stem and calyx of an apple, each of which the controller 35 may be programmed to identify. In the example where the item of produce is an apple, the controller may identify between the stem and calyx of the apple.

Where there is more than one feature, and the features are predictable anatomical markers located in a common relationship to each other, such as the stem and calyx of an apple, the desired pickup orientation may be set with respect to one of the features, for example the stem of an apple. As the controller 35 may identify which feature it locates, for example either the stem or calyx of the apple, the orientator may rotate through a different angle for each feature to arrive at the same desired pickup orientation. For example, if a calyx was identified the orientator would rotate through 180 degrees more or less in order to still place the item of produce in the desired pickup orientation with respect to the stem.

Alternatively, the controller 35 may instruct a rotation of approximately 180 degrees, then fine tune the alignment of the stem with the orientation sensing camera before rotating the apple through the pre-determined angle to reach the desired pickup orientation.

Where the produce is to be oriented according to a representative colour, texture or pattern, the controller 35 may be programmed such that the feature is the desired representative colour, texture or pattern. In the case of these forms of features the controller 35 may view the whole, or substantially the whole, of the surface of the produce during its multi-axial rotation by the rotation means 16 before determining the portion which closest matches the desired feature. The item of produce may then be oriented into the desired pickup orientation with respect to this portion. In this configuration the desired pickup orientation may be such that the representative portion of each item of produce may be oriented facing upwards, parallel with the ZZ direction so that the feature is clearly visible when the produce is packed. For example, it may be preferred to pack apples with the "reddest" portions facing upwards.

Produce may be oriented according to both a physical anatomical feature and a representative colour, texture or pattern. In this case the controller 35 may monitor the location of both the features, instructing the orientator to rotate the produce into the desired pickup orientation so that the produce is oriented with respect to both features. For example, it may be preferred to pack apples with the stem-calyx axis positioned in the XX-YY plane and with the "reddest" portion of the apple surface facing upwards. In this configuration the controller would ensure the apples are located both so that the stem-calyx axis is positioned in the XX-YY plane, and that the representative colour portion faced upwards.

By orienting the produce into a desired pickup orientation with respect to a feature it may be possible to create a greater degree of uniformity in the appearance of the packed produce. This may have an aesthetically pleasing effect, and may increase the potential sale value of the produce. Additionally, for produce of non-uniform shapes, such as pears, orienting according to the non-uniform portions of the shape may increase the efficiency with which the produce 3 may be packed onto the receptacles 7. As transportation costs for produce increase as the volume to be transported increases, more compact packing of produce may decrease the cost of transportation.

While items of produce may first be oriented according to a feature, such as a stem and/or calyx position, the produce may also be oriented in order to present a surface compatible to the suction cup 30 or produce holder 29. Depending on the type of produce, orientation in order to present a suction-compatible or grip-compatible surface may be provided during the initial orientation of the produce, or may be provided by a set amount of further rotation once the desired feature has been identified by the orientation sensing camera 15. For example, where apples are packed by the produce packing robot the stem-calyx axis may first be identified by the orientation sensing camera, then the apples rotated through a further angle so that the stem-calyx axis is approximately parallel to the XX-YY plane. In the case of apples the side portions which are presented upwards in this orientation are generally of similar shape, with a continuous surface that may be more compatible with a suction cup. For other produce where such side portions would not all be likely to present a suction-compatible surface the a most suction-compatible portion may be set as a desired feature by the controller 35, the surfaces of the produce analysed by the orientation sensing camera, and the produce additionally oriented according to a suction-suitable portion.

As the stem and calyx are generally located at opposite ends of the axis of the apple this will orient the stem in the desired pickup orientation. Orientation according to sensed features other than the desired feature may be applied to any other type of produce having features which are at a common location with respect to the desired feature. While a stem and calyx may be used for orientation, other physical features such as the crease or fold in the flesh of an apricot. In the example of an apricot, sensing of the crease or fold and its direction may be used by an orientation module 12 to more rapidly orient either the top or bottom portion of the apricot towards the orientation sensing camera 15.

By having the orientator orient item of produce only in the XX-YY plane the rate with which items of produce become ready to be picked up may be increased. This has the advantage of increasing the throughput of produce through the orientation modules, and thus potentially increasing the throughput of the produce packing robot.

In addition to the discussed features for orientation produce may optionally be oriented by the orientator 16 with respect to a physical size of the produce. The controller 35 may determine from the orientation sensing camera while the produce is rotated the dimensions of the produce, or the dimensions of the produce when oriented according to other features as previously described. The controller 35 can then direct the heads 21 to pack produce into receptacles such that similarly sized produce are packed together. In order to pack multiple sizes of produce at the same time, multiple receptacles 7 may be provided in the drop off zone 5. In this configuration an additional produce size sensor may be provided above the pickup locations in the orientation modules to provide more accurate information on the size of the produce the controller 35.

When an item of produce is in its desired pickup orientation this orientation is detected by the controller 35 and a head 21 may be allocated to pick up the item of produce. Additionally, the controller 35 may also detect when a desired produce feature or the primary feature has been identified and/or aligned with the orientation sensing camera. This would indicate to the controller 35 that the produce is almost ready to be picked up (e.g. but not yet rotated to a desired pickup orientation). This advance warning of readiness may be used by the controller 35 in prioritizing the movements of the heads 21 in order to increase the produce packing robot's packing efficiency, and decrease the time that a produce item is waiting in the desired orientation position ready for pickup.

If all heads 21 already have picked up an item of produce, or if there are a sufficient number of ready items of produce to fill all the heads, then the controller 35 may ignore any almost ready signal. Otherwise, the controller 35 may estimate from the almost ready signals which pickup point will have a ready item of produce next, and positions a head 21 over that pickup point.

In deciding whether to wait for an item of produce to become ready after an almost ready signal the controller 35 may decide based on a comparison between the estimated time to be ready and the time required to drop off produce from other heads return to the pickup location. The controller may also base this decision on either or both of a) the number of items of produce that are currently held by the heads 21, b) the number of pickup points which have an item of produce ready for pickup, and c) the number of pickup points which have an item of produce almost ready for pickup.

In making decisions regarding picking up and dropping off produce the controller 35 may be programmed to operate the produce packing robot in order to increase the rate at which produce is packed and the efficiency of the robot in terms of the utilisation of the heads 21 and orientation modules 12.

In one configuration the number of orientation modules 9 and pickup locations 14 may be greater than or equal to the number of heads 21.

In a preferred configuration the number of pickup locations 14 is greater than the number of heads 21. For example, the number of pickup locations may be between 2-3 times greater than the number of heads. Where the number of pickup locations is greater than the number of heads, the heads 21 may then move laterally parallel to the YY axis between a plurality of different orientation modules 12 and pickup locations 14 depending on where produce is to be picked up from.

In the preferred form the produce packing robot has approximately double the number of orientation modules and thus produce pickup locations 14 than it has heads 21 on the multi-head robot 20. However, it is expected that the ratio of orientation modules and heads on the robot may be customized to suit the time commonly taken to place a produce into the desired pickup orientation. This time may vary between types of produce. Having more pickup locations allows the packing robot to operate more efficiently, by making it more likely that all the pickup heads can immediately pick up produce that is ready and waiting in a desired pickup orientation.

The movements of the heads 21 parallel to the YY axis between the pickup locations of each orientation module 12 are to be dependent on what pickup locations have an item of produce ready, or almost ready, for pickup, what heads are already holding a produce item, and the distance from an available head to the pickup location.

Figure 8:
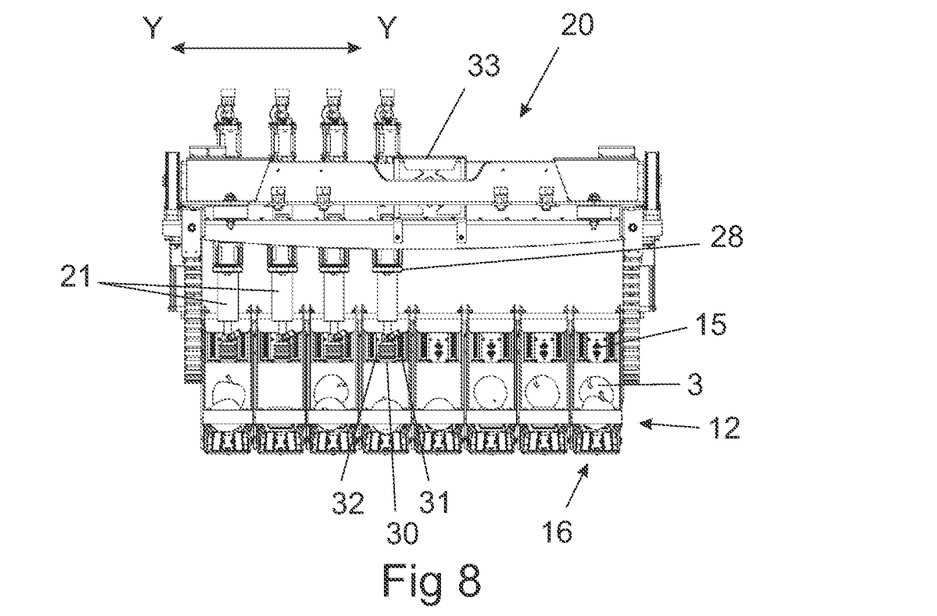
FIG. 8 shows the assembly of FIG. 7 showing a different spacing of the individual heads where the heads are all grouped together towards the left-most pickup locations.

While packing produce, the heads 21 of the multi-head robot may be in any desired positions along an axis parallel with the YY axis, however the heads 21 may not overlap each other. This means that not all heads 21 may service all pickup locations. As shown in FIG. 8 all the heads 21 may be oriented at one extreme to one side of the produce packing area 4. Although in the configuration shown the heads 21 are spaced apart the distance between each pickup location 14, it is contemplated that the spacing of the pickup locations and heads could be such as to accommodate the heads moving closer together than the pickup location spacing. This would facilitate picking up produce from pickup locations towards either side of the produce packing area when the heads towards that side were already carrying an item of produce.

In order to pick up a ready item of produce 3 from a pickup location 14, the controller 35 must direct the multi-head drive assembly 23 to align a desired pickup head 21 of the multi-head XX direction over the relevant pickup location. The head, or a number of heads, may also be directed by the controller to vary their spacing and translate in the YY direction to locate the desired pickup head over the relevant pickup location. An extension of the head in the ZZ direction then brings the suction cup 30 into contact with the item of produce 3, and vacuum is applied. Because items of produce within a certain type, such as apples, may vary in size, the dimension of the produce in the ZZ direction may be sensed by the produce orientation camera 15 or another sensors in the orientation modules 12. By communicating the sensed height of the item of produce to the controller 35, the relevant pickup head may be extended such that the suction cup 30 may be placed at the correct ZZ location in order to contact the produce, but not extended so far as to forcibly contact the produce which may damage it.

In determining the desired pickup head for a ready item of produce at a pickup location the controller 35 may consider:

a) the status of the other heads, e.g. whether they are already carrying an item of produce or are in the process of picking up an item of produce, b) the lateral motion in the YY direction, and number of heads required to articulate in the YY direction, for any head to align with the desired pickup location, c) the status and relative locations of other pick up locations, e.g. whether other side-by-side or near pickup locations have a ready item of produce, d) the location of currently un-filled drop off points in the receptacles, and the relative distances from the pickup location with the ready produce to the un-filled drop off points.

The packing produce controller 35 may prioritize any of these factors so as to minimize or optimize them to decrease the time that items of produce are ready and waiting at any pickup location, decrease the total movement of the heads in the XX or YY directions, or otherwise increase the throughput of the produce packing robot.

In considering any of the above factors the controller 35 may prioritize some pickup locations over other pickup locations. Additionally, the controller 35 may cause items of produce to be picked up while other heads in the array of heads already have picked up an item of produce and are waiting to move into the drop off zone.

A collapsible cushion portion 32 is provided between the suction cup 30 and the head 21 enable sealing of the suction cup and to prevent damage to differently sized produce items. The collapsible cushion may be used on the heads along with produce size information provided by the sensors of the orientation module, or may be used in an embodiment where this information is not provided. The collapsible cushions 32 have a concertina-like structure, and the inside of the cushion experience the vacuum or pressure that is provided by the air inlet 31 to the suction cup 30. Under a positive pressure the collapsible cushion 32 expands and lengthens. Under a vacuum the collapsible cushion 32 contracts and shortens in length. Additionally, under a compressive force the collapsible cushion 32 will deform and contract with low resistance. These features of the collapsible cushion 32 decrease the chance of an item of produce being damaged when it is picked up or dropped off.

When a head 21 is extended downwards in the ZZ direction so that the suction cup 30 contacts the produce 3, a degree of over-extension of the head 21 may be possible without the rigid portions of the head contacting the produce and damaging it, as the collapsible cushion 32 will deform to compensate for the over extension. Upon a vacuum being provided the collapsible cushion will contract and shorten in length. When the item of produce is lowered and located over the desired drop off point and the vacuum is released the collapsible cushion will expand, allowing the produce to gently drop any remaining distance from where it was positioned to the drop off point. In the case where the produce is located by the head 21 close to or on the drop off point 6, when the vacuum is released and the cushion would normally expand to its neutral position the collapsible cushion 32 remain deformed with low resistance and not cause damage to the produce.

The configuration of the collapsible cushion 32 and suction cup 30 may be such that when the vacuum is released the collapsible cushion expands from its contracted position before the produce is released from the suction cup. In this configuration the item of produce is gently lowered onto the drop off point, then released by the suction cup, preventing the produce from being dropped onto the drop off point, and any possible resulting damage.

Between when an item of produce is picked up by a head and when it is dropped off into the desired drop off point, the produce may be rotated into a desired drop off orientation. This rotation into the drop off orientation is provided by a rotation of the head parallel to the ZZ axis, in the direction W as shown in FIG. 1. This rotation is about an axis orthogonal to the XX and YY directions, and thus will not change the rotational orientation of the produce in about these directions. This rotation may be provided in place of, or in addition to, any rotation about a ZZ direction that is provided by the orientator 16 of the orientation module 12. For example, the produce may be presented in a tray having the same direction, as shown in FIG. 12 where the stems are all aligned parallel.

By providing desired rotation of the produce in the ZZ axis by the head 21 rather than the orientator 16 the time an item of produce spends at the orientation module may be decreased. Further, the overall time to pack an item of produce may be decreased as the rotation by the head may be provided in the transit time when the produce is being moved from the pickup location to the drop off point.

In the example where an item of produce is sorted that has two features along a centroid axis such as the stem and calyx of an apple, the orientation module may orient the apple into the desired pickup orientation with respect to either the stem or calyx. In this example the desired pickup orientation would be an orientation where the stem-calyx axis lies in the XX-YY plane. The orientation module may then indicate to controller 35 which feature the apple has been arranged with respect to, and the orientation of the stem-calyx axis with respect to the XX or YY directions. The controller 35 may then operate the head 21 which picks up the item of produce through a rotation to align the stem or calyx in the desired orientation, compensating for the difference in the stem-calyx axis orientation to either the XX or YY direction on pickup.

For example, some apples will have their stem located and aligned in a particular direction by the orientator, while others will have the calyx identified and aligned. Therefore, in order to achieve the desired final orientation of the apples with either the stem or calyx in one direction, the controller may operate the head 21 to rotate some apples by 180 degrees more or less. This will cause all apples to be finally oriented with their stems in one direction, regardless of whether they were oriented for pickup with respect to the stem or calyx.

The desired final orientation may be varied by a user through the controller 35. The controller 35 may be configured such that the user-inputted final orientation may be in three dimensions, and the controller may calculate the consequential desired pickup orientation and required rotation of the heads in order to achieve the desired final orientation.

For example, the desired drop off orientation for an item of produce may be between 20 and 70 degrees between the XX and YY directions, or the desired drop off orientation may be approximately 45 degrees with respect to either the XX or YY directions, or otherwise depending on the angle of the receptacles, so that the desired features lies at approximately 45 degrees to the sides of the receptacle.

From its vantage point over the drop off zone 5 the destination sensing camera 33 is able to scan the contours of the surface below where the trays or receptacles 7 are located. The trays or receptacles will have a number of desired drop off points 6 for produce 3.

In trays where the desired drop off points correspond to depressions or pockets 34 in the tray or box, the pockets 34 and thus the desired drop off points may be determined by scanning the contours of the trays or receptacles 7.

Where trays without depressions or pockets are used the destination sensing camera 33 may determine the extremes of the tray, or the location of side walls if present.

Additionally, the contours may be used to indicate whether a pocket is empty or whether it contains an item of produce. The information from the destination sensing camera on the availability and location of drop off points is communicated to the multi-head robot in order to determine where produce are dropped off. According to this method of drop off point sensing using the destination sensing camera 33 a variety of trays of different sizes, types and configurations may be used during a single packing operation.

For example, this may allow continuous sorting even when trays or receptacles, which may be placed by humans or by machine onto the receptacle conveyor, are placed out of alignment with one another. Additionally it may allow for a continuous sorting operation between batches of types or sizes of receptacles. It may also allow a greater portion of the drop off zone to be filled with trays if smaller sized trays are used, as trays may still be filled even if they are placed in in parallel with each other, e.g. in the transverse or YY direction.

Where produce is packed into receptacles that are in the form of punnets, boxes or cartons that are to have multiple layers of produce packed into them information provided by the destination sensing camera may allow the controller 35 consider the heights and distributions of produce in the receptacles in making further packing decisions. This may results in produce, particularly produce of varying sizes or shapes, which is able to be more efficiently sorted into a given space in the receptacle. This may decrease the total storage space required for the packed produce, and decrease costs associated with shipping the produce.

In packing produce from the orientation modules 12 to the trays or receptacles 7 the controller 35 of the produce packing robot prioritizes filling the vacant drop off points which are furthest from the orientation modules. This acts to decrease the distance travelled and time taken of the multi-head robot 20 transiting in the XX direction. The produce packing robot also prioritizes picking up produce as soon as they are ready to be picked up. This may mean that the multi-head robot may hover over the pickup locations 14 when some heads already have produce on them if an item of produce has just become ready.

Additionally, the controller 35 may decide to hover over a pickup location while already holding produce in other heads when it determines from an orientation sensing camera that an item of produce is almost ready to be picked up. As described previously, this almost ready signal may be provided when one of multiple desired features, not being the primary feature, are detected, or when the primary feature is oriented towards the orientation sensing camera 15 and only a small rotation is required to place the item in its desired pickup orientation. By hovering and waiting for an orientation an item of produce to become ready this may act to decrease the amount of time that each orientation module is sitting waiting with an item of produce ready to be picked up, and to increase the amount of time the each orientation module is actively orienting an item of produce. Each of these prioritizations act to increase the throughput of produce that is able to be packed by the produce packing robot.

The receptacles 7 are passed through the drop off zone 5 on the receptacle conveyor 8. Depending on the configuration, the controller 35 may operate the receptacle conveyor 8 to move in a stepped-fashion, moving a predetermined distance in the XX direction, for example the distance may correspond to the spacing between the drop off points 11, and stopping until the pockets are loaded once a number of drop off points are filled with produce. Alternatively, the controller may operate the receptacle conveyor 8 such that the conveyor moves continuously, at a variable speed as required, or at a constant speed. Alternatively still, the controller may control the speed and/or direction of the conveyor 8, to suit.

In order to coordinate the multiple moving parts of the produce packing robot the controller 35 may be configured to translate the coordinate systems of each moving component into a universal coordinate system. This would allow, for example, the location of available drop off points to be continuously determined by information from the destination sensing camera 33 which was located attached to the multi-head robot as it moves in the XX direction. By translating the moving coordinate space of the destination sensing camera, the controller 35 may continuously determine the real-space location of the available pockets. This process of translation similarly applies to the other moving parts of the produce packer robot, including the receptacle conveyor 8 and individual heads 21.

In the primary embodiment a plurality of pickup locations are provided.

In the primary embodiment the produce packer robot may pack any one type of produce. Alternatively, the produce packer robot may pack multiple types of produce at the same time.

The produce packing robot may be provided with a single controller which operates all the functions of the packing robot and makes decisions relating to packing, or multiple distributed controllers may be provided which each operate aspects of the function of the packing robot and/or make decisions relating to packing.

Broadly, the produce may be any type of agricultural or natural produce, including fruits or vegetables. More specifically, the produce may be any type of fruit or vegetable, specifically including but not limited to apples, pears, kiwifruit, melons, stone fruits, tomatoes and capsicums.

By providing a robot having multiple heads the produce packing robot may pack an increased number of items of produce. By having the plurality of heads 21 of the robot moveable independently in some directions but fixed so that they translate together in one direction, a greater number of robots may be provided without the associated concerns of collisions between the multiple heads. Accordingly, the produce packer robot is able to provide a large number of heads in a compact space. By increasing the compactness of the heads a large volume of produce may be packed while requiring a decreased overall footprint of the produce packing robot. A produce packing robot of decreased footprint means that less pack house space may be required to house the robot, and that number of items of produce packed in a given space may be increased.

The foregoing description of the invention includes preferred forms thereof. Modifications may be made thereto without departing from the scope of the invention as defined by the accompanying claims.

The invention claimed is:

1. A robot for packing produce comprising;
   a plurality of pickup locations for the produce, the pickup locations arranged in an array,
   a drop off zone for the produce,
   a plurality of heads, arranged in an array, each head for picking up, holding, and dropping off an item of produce, and
   a controller configured to control movement of the heads,
   wherein the plurality of heads move together as a set in a first direction between the array of pickup locations and the drop off zone, and
   wherein each head is independently moveable in a second direction that is orthogonal to the first direction, and
   wherein each head is capable of independently varying the relative spacing between the plurality of heads in the second direction, and
   wherein each of the plurality of pickup locations further comprises an orientation module for presenting an item of produce in a pickup orientation with respect to at least one feature of the produce, each orientation module comprising:
      at least one orientation sensing camera for detecting and determining the location of the at least one feature, and
      an orientator configured to manipulate the item of produce into the pickup orientation,
   wherein the orientation module is configured to provide an indication to the controller, when the at least one feature is detected by the orientation sensing camera, that an item of produce is nearly ready to be picked up,
   wherein the controller is configured to receive a nearly ready signal based on the indication provided by the orientation module, and
   wherein the controller is configured to determine whether to:
      a) ignore the nearly ready signal and move the heads to the drop off zone before the item of produce becomes ready, or
      b) wait for a nearly ready item to become ready before moving the heads to the drop off zone.

2. The robot of claim 1, wherein the orientator multi-axially rotates the item of produce until the feature is detected by the orientation sensing camera, after which the location of the feature with respect to the produce is determined.

3. The robot of claim 2, wherein the item of produce is subsequently rotated into the desired pickup orientation.

4. The produce packing robot of claim 1, wherein the at least one feature comprises at least one of:
   a) a physical anatomical feature,
   b) a portion most visually similar to a desired colour,
   c) a desired pattern, or
   d) a desired texture.

5. The produce packing robot of claim 1, wherein the orientation of the produce is determined via the at least one orientation sensing camera with respect to a plurality of features, one of said features being a primary feature with respect to which the produce is placed in the desired pickup orientation.

6. The produce packing robot of claim 1, wherein the orientator comprises:
   a pair of independently controlled and laterally spaced drive belts, configured to support an item of produce, and
   a boundary at least partially surrounding the item of produce to constrain translational movements of the produce, wherein the plurality of drive belts are able to drive at different rates in order to multi-axially rotate the item of produce.

7. The produce packing robot of claim 1, wherein the receptacles are trays or boxes having contoured pockets for receiving items of produce, the contoured pockets defining drop off points of the drop off zone, and wherein the produce packing robot further comprises a destination sensing camera configured to sense one or more of the location, size and orientation of the contoured pockets.

8. The produce packing robot of claim 7, wherein the destination sensing camera is a range imaging camera selected from:
   a) a structured light camera,
   b) a RGBD camera,
   c) a stereo camera pair, or
   d) a time-of-flight camera.

9. The produce packing robot of claim 1, wherein the number of heads is less than the number of pickup locations for the produce.

10. The produce packing robot of claim 1, wherein packing an item of produce involves:
   a) locating the array of heads in the first direction so that at least one head is aligned in the first direction with an item of produce at a pickup location,
   b) independently varying the spacing of one or more heads in the second direction to align in the second direction the at least one head with the item of produce,
   c) picking up the item of produce,
   d) transporting the item of produce in the first direction to the drop off zone such that item of produce is aligned in the first direction with a desired drop off point, and
   e) dropping off the item of produce to the desired drop off point.

11. The produce packing robot of claim 10, wherein prior to dropping off the items of produce, the spacing of one or more heads is varied in the second direction.

12. The produce packing robot of claim 10, wherein the packing of an item of produce also involves a rotation of the desired head about an axis parallel to a third direction in order to rotate the item of produce to a desired drop off orientation.

13. The produce packing robot of claim 1, wherein the produce to be packed is sorted by size or by the at least one feature, as sensed by the orientation sensing camera of each orientation module.

14. The produce packing robot of claim 1, wherein the orientation module is configured to indicate to the controller when an item of produce is in a desired pickup orientation and ready to be picked up.

15. The produce packing robot of claim 14, wherein after the orientation module indicates the item of produce is nearly ready to be picked up, the controller determines whether to move the heads depending on:
   a) the number of heads which have picked up and are holding an item of produce,
   b) the number of pickup points having an item of produce ready to be picked up, and
   c) the number of pickup points having an item of produce nearly ready to be picked up.

16. The produce packing robot of claim 14, wherein after the orientation module indicates the item of produce is nearly ready to be picked up, the controller ignores the indication and drops off the items of produce currently held by the heads if:
   a) all the heads are already holding an item of produce, or
   b) the number of items of produce ready for pickup are greater than or equal to the number of heads not holding an item of produce.

17. The produce packing robot of claim 14, wherein the controller bases the determination whether to move the heads on an estimated comparison of the time until the item of produce is oriented into the desired pickup orientation and is ready to be picked up and the time required to drop off the items of produce currently held by the heads and return to the pickup location.

18. A method of packing produce utilising the robot as claimed in claim 1.

19. The produce packing robot of claim 1, wherein the drop off zone is provided with one or more receptacles for receiving the produce provided, the one or more receptacles defining one or more desired locations for placing items of produce, and the desired locations for placing items of produce being the drop off points for the produce.

* * * * *